United States Patent
Shea

(10) Patent No.: US 9,745,069 B2
(45) Date of Patent: Aug. 29, 2017

(54) AIR-LIQUID HEAT EXCHANGER ASSEMBLY HAVING A BYPASS VALVE

(71) Applicant: HAMILTON SUNDSTRAND CORPORATION, Windsor Locks, CT (US)

(72) Inventor: Brian R. Shea, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 706 days.

(21) Appl. No.: 13/746,073

(22) Filed: Jan. 21, 2013

(65) Prior Publication Data

US 2014/0202663 A1    Jul. 24, 2014

(51) Int. Cl.
| | |
|---|---|
| *F28F 27/00* | (2006.01) |
| *B64D 15/06* | (2006.01) |
| *F28F 27/02* | (2006.01) |
| *B64D 13/06* | (2006.01) |
| *F28D 21/00* | (2006.01) |

(52) U.S. Cl.
CPC .............. *B64D 15/06* (2013.01); *F28F 27/02* (2013.01); *B64D 2013/0666* (2013.01); *B64D 2013/0674* (2013.01); *F28D 2021/0021* (2013.01); *F28F 2250/06* (2013.01)

(58) Field of Classification Search
CPC   B64D 15/02; B64D 15/06; B64D 2013/0674; F28F 27/02; F28F 2250/06; F28D 2021/0021

See application file for complete search history.

(56) References Cited

U.S. PATENT DOCUMENTS

| | | | | |
|---|---|---|---|---|
| 2,514,105 | A * | 7/1950 | Thomas | B64D 15/02 244/123.12 |
| 2,551,697 | A * | 5/1951 | Palmatier | B64D 15/02 244/134 B |
| 2,628,482 | A * | 2/1953 | Burgess | B64D 13/06 62/172 |
| 2,691,274 | A * | 10/1954 | Whitney, Jr. | B64D 13/06 62/171 |

(Continued)

FOREIGN PATENT DOCUMENTS

EP    0019492 A2    11/1980

OTHER PUBLICATIONS

European Search Report for application 14151815.9, mailed May 9, 2014, 5 pages.

*Primary Examiner* — Ljiljana Ciric

(74) *Attorney, Agent, or Firm* — Cantor Colburn LLP

(57) ABSTRACT

An air-liquid heat exchanger assembly for an environmental control system of an aircraft includes a heat exchanger, a controller, and a bypass valve. The heat exchanger includes a first chamber and a second chamber. The first chamber has a first inlet that is provided a liquid and a first end that is provided air. The second chamber is arranged adjacent the first chamber. The bypass valve is operably coupled to the controller. The bypass valve having an inlet coupled to a first outlet of the first chamber, a first outlet coupled to a second inlet of the second chamber, and a second outlet coupled to a bypass conduit. The controller adjusts a position of the bypass valve to control the flow of liquid through the second chamber and the bypass conduit.

9 Claims, 2 Drawing Sheets

(56) References Cited

U.S. PATENT DOCUMENTS

| | | | | |
|---|---|---|---|---|
| 3,097,504 | A * | 7/1963 | Quick | B64D 13/06 62/241 |
| 3,208,234 | A * | 9/1965 | Messinger | B64D 13/06 62/119 |
| 4,434,624 | A * | 3/1984 | Cronin | B64D 13/06 62/172 |
| 4,557,112 | A * | 12/1985 | Smith | F01K 7/00 60/651 |
| 5,214,935 | A | 6/1993 | Brunskill | |
| 5,553,461 | A * | 9/1996 | Hitzigrath | B64D 13/00 62/150 |
| 5,906,111 | A * | 5/1999 | Lui | B64D 13/06 62/172 |
| 8,745,996 | B2 * | 6/2014 | Qiao | F25B 9/008 62/115 |
| 9,175,695 | B2 * | 11/2015 | Bulin | B64D 29/00 |
| 9,175,883 | B2 * | 11/2015 | Koberstein | F25B 40/00 |
| 9,188,380 | B2 * | 11/2015 | Lu | G05D 23/00 |
| 9,234,453 | B2 * | 1/2016 | Atz | F02B 29/0475 |
| 9,234,604 | B2 * | 1/2016 | Kim | F28F 27/02 |
| 9,234,707 | B2 * | 1/2016 | Mackin | F28F 3/025 |
| 9,239,001 | B2 * | 1/2016 | Birgler | F02B 47/08 |
| 9,253,921 | B2 * | 2/2016 | Campbell | H05K 7/20281 |
| 9,263,851 | B2 * | 2/2016 | Hirota | H01S 3/16 |
| 9,267,715 | B2 * | 2/2016 | Scheibert | F25D 21/04 |
| 9,267,716 | B2 * | 2/2016 | Song | F25B 30/02 |
| 9,273,632 | B2 * | 3/2016 | Ueda | F28F 3/02 |
| 9,285,050 | B2 * | 3/2016 | Campbell | F28F 27/00 |
| 9,295,181 | B2 * | 3/2016 | Campbell | H05K 7/20281 |
| 2002/0121103 | A1 | 9/2002 | Udobot et al. | |
| 2003/0042361 | A1 * | 3/2003 | Simadiris | B64D 11/04 244/118.5 |
| 2005/0092481 | A1 * | 5/2005 | Wyatt | F28D 7/005 165/274 |
| 2007/0119205 | A1 * | 5/2007 | Zywiak | B64D 13/06 62/401 |
| 2011/0297352 | A1 * | 12/2011 | Guillaume | F02C 7/224 165/104.13 |
| 2012/0255711 | A1 * | 10/2012 | Andres | B64D 13/06 165/104.31 |
| 2012/0255715 | A1 * | 10/2012 | Army | B64D 13/06 165/148 |
| 2014/0083106 | A1 * | 3/2014 | Mackin | F28F 3/025 60/772 |
| 2014/0116664 | A1 * | 5/2014 | Landre | F28F 3/025 165/166 |
| 2015/0316334 | A1 * | 11/2015 | Chainer | G06F 1/206 165/287 |
| 2015/0323225 | A1 * | 11/2015 | Matsumoto | F25B 5/04 62/324.1 |
| 2015/0337691 | A1 * | 11/2015 | Somani | F01K 15/00 60/645 |
| 2015/0345843 | A1 * | 12/2015 | Voorhis | F28F 9/0273 62/504 |
| 2015/0362263 | A1 * | 12/2015 | Wang | F28F 9/0273 165/100 |
| 2015/0362268 | A1 * | 12/2015 | Maeda | G05D 23/1917 165/294 |
| 2015/0369548 | A1 * | 12/2015 | Fersti | F28F 27/00 165/296 |
| 2016/0003508 | A1 * | 1/2016 | Esformes | F25B 39/028 165/117 |
| 2016/0003564 | A1 * | 1/2016 | Theberge | F28F 27/02 165/104.31 |

* cited by examiner

AIR-LIQUID HEAT EXCHANGER ASSEMBLY HAVING A BYPASS VALVE

BACKGROUND OF THE INVENTION

Exemplary embodiments of this invention generally relate to environmental control systems of an aircraft and, more particularly, to an air-liquid heat exchanger assembly of an environmental control system.

Commercial jet aircrafts typically include environmental control systems (ECS) that regulate air supply, temperature, and cabin pressurization on the aircraft. Such an ECS may also be utilized to cool components of the aircraft itself, such as electrical systems. The ECS of most jet aircrafts typically includes two or more ECS packs which provide pressurized air of an appropriate temperature to the cabin of the aircraft by utilizing heated, pressurized bleed air from the engines or auxiliary power unit of the aircraft, as well ambient ram air that enters the aircraft through a ram scoop.

An ECS pack includes an air cycle machine fluidly connected to one or more air-liquid heat exchangers. At least one of the air-liquid heat exchangers is used to increase the temperature of the air, and decrease the temperature of the liquid so that both may be provided at a correct temperature to downstream loads. Some known ECS systems include a bypass valve positioned upstream of the entire air-liquid heat exchanger to allow the liquid to bypass the entire heat exchanger assembly to attain a desired downstream mix temperature. As a result, portions of the air-liquid heat exchanger cold air circuit may freeze or portions thereof may deviate from adequate operating conditions.

BRIEF DESCRIPTION OF THE INVENTION

According to one embodiment of the invention, an air-liquid heat exchanger assembly for an environmental control system of an aircraft is provided. The air-liquid heat exchanger that includes a heat exchanger, a controller that monitors operating conditions of the heat exchanger, and a bypass valve. The heat exchanger includes a first chamber and a second chamber arranged adjacent to the first chamber. The first chamber has a first inlet, a first outlet, and a first end extending between the first outlet and the first outlet. The first inlet is provided a liquid and the first end is provided air discharged from an outlet of a turbine. The second chamber has a second inlet and second outlet. The second outlet is coupled to a bypass conduit, wherein the air discharged from the outlet of the turbine initially passes over the first chamber and subsequently passes over the second chamber. The bypass valve is operably coupled to the controller. The bypass valve has an inlet, a first outlet, and a second outlet. The inlet is coupled to the first outlet of the first chamber by a first conduit. The first outlet is coupled to the second inlet of the second chamber by a second conduit. The second outlet is coupled to the bypass conduit. The controller adjusts a position of the bypass valve to control the flow of liquid through both the second chamber and the bypass conduit in response to a signal received from the controller that is based on the operating conditions.

According to an alternate embodiment of the invention, an environmental control system for an aircraft is provided including an air cycle subsystem and a liquid cycle subsystem. A heat exchanger configured to transfer heat between air of the air cycle subsystem and liquid from a liquid cycle subsystem. The heat exchanger includes a first chamber and a second chamber. The second chamber being arranged generally in series relative to a flow of the liquid. A bypass valve operably coupled to a controller. The bypass valve is positioned between and coupled to the first chamber and the second chamber. The bypass valve is configured to control the flow of the liquid through both the second chamber and a bypass conduit in response to measured operating conditions of the environmental control system.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
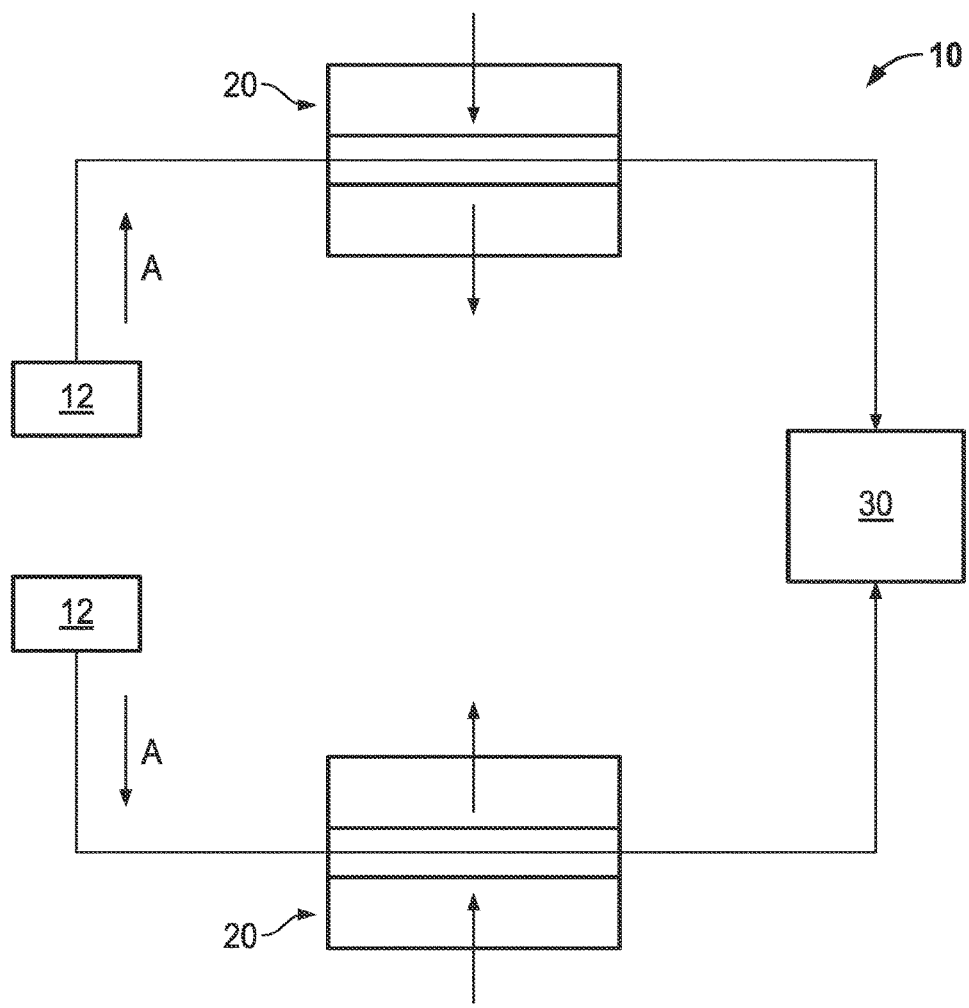
FIG. 1 is a schematic diagram of a conventional environmental control system (ECS) in an aircraft.

A schematic diagram of a pertinent portion of an environmental control system (ECS) 10 is illustrated in FIG. 1. In one embodiment, the ECS 10 can be utilized in aircrafts and other vehicles to provide a conditioned airflow, such as for cooling the cabin of the fuselage of the aircraft, or for cooling avionics or other heat sensitive electronics for example. The ECS 10 as illustrated includes various components such as, for example, turbo compressors, air cycle machines, heat exchangers, and other components which are closely packaged to define an ECS pack 20. The ECS 10 may include any number of ECS packs 20 to supply conditioned air to various heat loads. The ECS pack 20 is generally mounted within an ECS bay of the aircraft. The ECS 10 is supplied with pressurized air A from an upstream source 12. Exemplary sources 12 include, but are not limited to, aircraft engine bleed and an external air source that is supplied by mechanically or electrically driven compressors, such as a cabin air compressor for example.

The components of the ECS pack 20 provide an air cycle refrigeration system that utilizes pressurized air through an air cycle machine architecture which may include heat exchangers, an air cycle machine, water separators, an associated bypass etc. . . . After the compressed air passes through the air cycle machine, the air, which has a desired temperature, may be vented into the cabin 30 or to electronic equipment of the aircraft.

Figure 2:
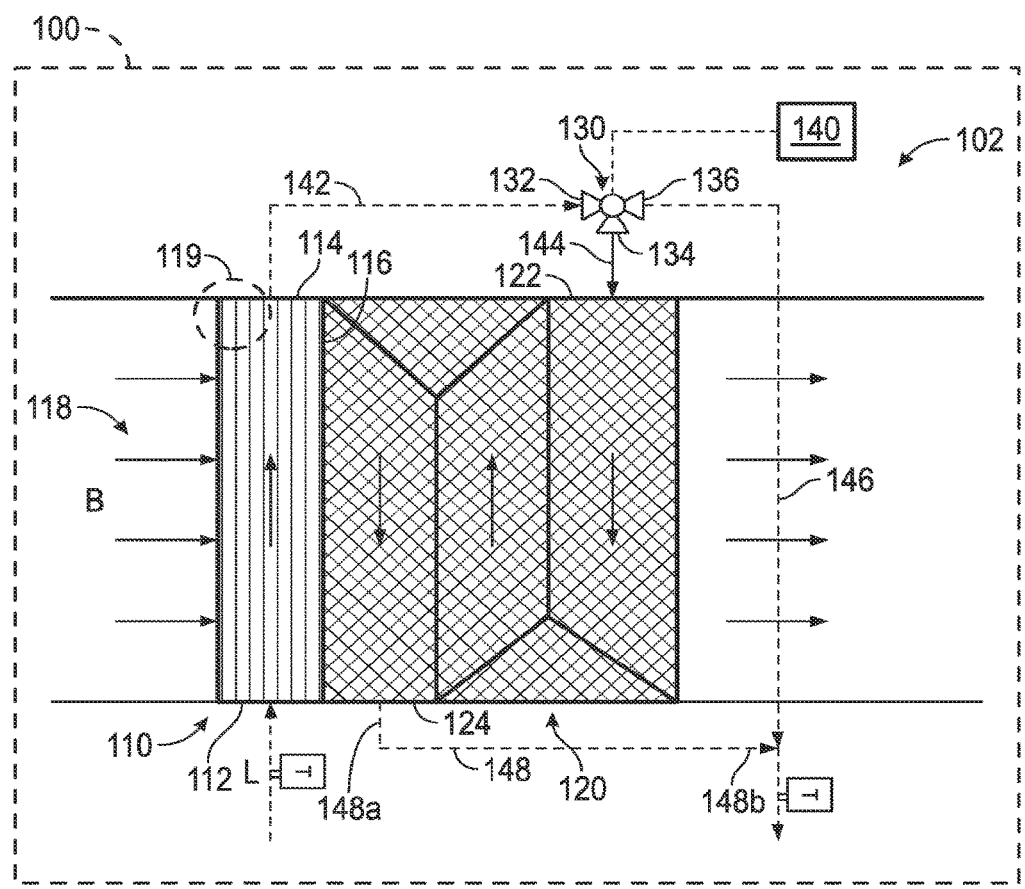
FIG. 2 is a top view of a fin layer of an air-liquid heat exchanger within an ECS pack 20 according to an embodiment of the invention.

Referring now to FIG. 2, air B discharged from the outlet of a turbine (not shown), such as a turbine of the air cycle machine, is provided to a portion 102 of an air-liquid heat exchanger assembly 100 within the ECS pack 20, such as a hot side fin layer for example. The air B is generally cold and may, but need not be, supplied from the same source as air A. The air-liquid heat exchanger assembly 100 is part of both an air cycle subsystem and a liquid cycle subsystem to form a heat exchange relationship there between. The liquid cycle subsystem utilizes a liquid L, such as a coolant, for example, which is cycled by a pump (not shown). The liquid L may function as either a heat source or a cooling medium, depending on its location in the liquid cycle subsystem.

The illustrated portion 102 of an air-liquid heat exchanger assembly 100 includes a first chamber 110 having a first inlet 112 and a first outlet 114 and an adjacent second chamber 120 having a second inlet 122 and a second outlet 124. A surface of the first chamber 110 is slightly separated from an opposite surface of the second chamber 120 by a separator 116, such as by an insulation gap or double closure bars for example. The first chamber 110 and the second chamber 120 are arranged generally in series with respect to the flow of the liquid L, but are not directly fluidly coupled.

As illustrated in FIG. 2, the first chamber 110 has a single pass, cross-flow core arrangement. In one embodiment, the liquid L provided at the first inlet 112 is generally warm and the air B provided at a first end 118 as a cooling medium configured to flow about the exterior of the portion 102 of the air-liquid heat exchanger 100 is generally cold. Although a particular configuration is illustrated and described in the disclosed embodiment, other configurations, for example core arrangements having multiple passes or a folded cross flow or cross-counter flow are within the scope of the present invention. The first chamber 110 of the illustrated portion 102 of an air-liquid heat exchanger 100 may have any type of construction, including, but not limited to, a tube fin, plate fin, or mini-channel tube fin construction. The portion 119 of the first chamber 110 where a cooled liquid L (near the first outlet 114) interacts with the cold air flow B, also referred to as the cold-cold corner or edge, is circled with a dotted line. In one embodiment, portion 119 includes additional and/or other fin features, such as electrical discharge machined slots, different fin types (including but not limited to straight, ruffled, wavy, louvered, serrated, perforated, pin, etc), advanced heat exchanger closure bar configurations, or blocker sheets for example.

As illustrated, the second chamber 120 has a three-pass, cross-counter flow core arrangement. Alternate configurations having any number of passes are, however, within the scope of the present invention. In addition, the second chamber 120 may have any type of construction, including, but not limited to, a tube fin, plate fin, or mini-channel tube fin construction.

A rotatable bypass valve 130, movable between a plurality of positions, is arranged between and coupled to the first chamber 110 and the second chamber 120. In one embodiment, the bypass valve 130 is operably coupled to a controller 140. The controller 140 monitors operating conditions of the air-liquid heat exchanger 100 and adjusts the position of the bypass valve 130 accordingly. For example, the controller 140 will adjust the position of the bypass valve 130 to modulate the flow rate while still maintaining adequate melt margins in the first and second chambers 110, 120. In one embodiment, the operating conditions include, but are not limited to, the altitude of the aircraft, the flow rate, and the temperature sensed upstream and downstream of the heat exchanger assembly 100 for both the liquid L and the air B for example.

A first conduit 142 couples the outlet 114 of the first chamber 110 to the inlet 132 of the bypass valve 130. A second conduit 144 extends from a first outlet 134 of the bypass valve 130 to the inlet 122 of the second chamber 120. A third conduit is connected to the second outlet 136 of the bypass valve 130 and extends generally in the direction of a heat load to re-mix back downstream of the heat exchanger. A conduit 148 attached to the outlet 124 of the second chamber 120 at a first end 148a is connected at a second end 148b to the third or bypass conduit 146 such that the liquid L flowing both through the portion 102 of the air-liquid heat exchanger 100 and around the portion 102 of the air-liquid heat exchanger 100 is ultimately remixed.

During operation, air B is provided at a first end 118 of portion 102 such that the air B initially passes over the first chamber 110 and subsequently passes over the second chamber 120. In one embodiment, the air B has a sub-freezing temperature. Liquid L is provided to the inlet 112 of the first chamber 110. In one embodiment, a temperature sensor T is arranged adjacent the first inlet 112 such that the temperature of the liquid L may be measured as it enters into the first chamber 110. As the liquid L passes through the first chamber 110, heat from the liquid L transfers to the cooler air B through convection. The relatively cooler liquid L exits the first chamber 110 at the outlet 114 and passes through conduit 142 to the bypass valve 130.

Depending on the position of the bypass valve 130, the flow of liquid L may be directed through the second chamber 120, around the second chamber 120, or both. If the bypass valve 130 is closed, the full flow of liquid L will enter the inlet 122 of the second chamber 120 from the first bypass outlet 134 and conduit 144. As the slightly cooled liquid L flows through at least one pass of the second chamber 120, heat transfers from the liquid L to the cooler air B. The then cooled liquid L exits the second chamber 120 into conduit 148. In embodiments where the bypass valve 130 is at least partially open, a portion of the flow of liquid L passes into the bypass conduit 146. In one embodiment, the bypass conduit 146 includes a temperature sensor T positioned downstream from where the conduit 148 is connected such that the temperature sensor T may measure the temperature of the combined flow from both the second chamber 120 and the bypass conduit 146.

By positioning the bypass valve 130 between the first chamber 110 and second chamber 120 rather than before the inlet 112 of the first chamber 110 as in the prior art, all of the available liquid L flows through the first chamber 110. This can preserve the heat exchanger melt margin and help reduce or prevent "face freezing" of the air-liquid heat exchanger 100 by flowing all of the available warm/hot liquid past the coldest air stream (cold side inlet face). In addition, this design allows for a highly compact and efficient air-liquid heat exchanger 100 that is sized to meet heat transfer performance and pressure drop requirements more effectively, while ensuring that an adequate melt margin may be maintained across all operating conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. An air-liquid heat exchanger assembly for an environmental control system of an aircraft comprising:
   a heat exchanger that includes:
      a first chamber having a first inlet, a first outlet, and a first end, the first inlet being configured to receive a liquid and the first end being configured to receive air, and a second chamber having a second inlet and a second outlet, the second chamber arranged adjacent to the first chamber, the second outlet coupled to a bypass conduit, wherein the air passes over the first chamber and subsequently passes over the second chamber;

a controller that monitors the operating conditions of the heat exchanger; and a bypass valve operably coupled to the controller, the bypass valve having an inlet directly coupled to the first outlet of the first chamber by a first conduit, the bypass valve having a first outlet directly coupled to the second inlet of the second chamber by a second conduit, and the bypass valve having a second outlet directly coupled to the bypass conduit wherein the controller adjusts a position of the bypass valve to control a flow of the liquid through both the second chamber and the bypass conduit in response to a signal received from the controller that is based on the operating conditions.

2. The air-liquid heat exchanger assembly according to claim 1, wherein the first chamber is positioned adjacent to the second chamber and is separated therefrom by an insulation gap.

3. The air-liquid heat exchanger assembly according to claim 1, wherein the liquid is a coolant.

4. The air-liquid heat exchanger assembly according to claim 1, wherein the first chamber has a single pass, cross-flow core arrangement.

5. The air-liquid heat exchanger assembly according to claim 1, wherein the operating conditions includes at least one of an altitude of the aircraft, a liquid flow rate, an air flow rate, a temperature of the liquid entering the first inlet of the first chamber, and a temperature of the liquid within the bypass conduit.

6. The air-liquid heat exchanger assembly according to claim 1, wherein the second chamber has a cross-counter flow core arrangement.

7. The air-liquid heat exchanger assembly according to claim 6, wherein the second chamber has a multiple pass core arrangement.

8. The air-liquid heat exchanger assembly according to claim 1, further comprising:

a first temperature sensor operably coupled to the controller, the first temperature sensor positioned to measure a temperature of a remixed liquid resulting from the liquid that bypasses the second chamber via the bypass valve via the bypass conduit and the liquid that exits the second outlet of the second chamber via a conduit that is attached to the second outlet of the second chamber at a first end and the conduit is connected at a second end to the bypass conduit bypass conduit.

9. The air-liquid heat exchanger assembly according to claim 8, further comprising:

a second temperature sensor operably coupled to the controller, the second temperature sensor arranged adjacent the first inlet of the first chamber, the second temperature sensor positioned to measure a temperature of the liquid entering the first chamber.

* * * * *